United States Patent
Kim et al.

(10) Patent No.: US 10,424,775 B2
(45) Date of Patent: Sep. 24, 2019

(54) LITHIUM BATTERY AND METHOD OF MANUFACTURING THE SAME

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Youngeal Kim, Hwaseong-si (KR); Wooyoung Yang, Hwaseong-si (KR); Kihong Kim, Asan-si (KR); Hyorang Kang, Anyang-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 156 days.

(21) Appl. No.: 15/584,234

(22) Filed: May 2, 2017

(65) Prior Publication Data

US 2017/0373304 A1 Dec. 28, 2017

(30) Foreign Application Priority Data

Jun. 28, 2016 (KR) .................. 10-2016-0081169

(51) Int. Cl.
| | | |
|---|---|---|
| *H01M 4/02* | (2006.01) | |
| *H01M 4/36* | (2006.01) | |
| *H01M 4/38* | (2006.01) | |

(52) U.S. Cl.
CPC .............. *H01M 4/02* (2013.01); *H01M 4/36* (2013.01); *H01M 4/366* (2013.01); *H01M 4/382* (2013.01)

(58) Field of Classification Search
CPC .......... H01M 4/02; H01M 4/36; H01M 4/366; H01M 4/382
See application file for complete search history.

(56) References Cited

U.S. PATENT DOCUMENTS

| | | | |
|---|---|---|---|
| 9,105,945 B2 | 8/2015 | Zhou | |
| 2004/0029009 A1* | 2/2004 | Sada | H01M 4/13 429/231.4 |
| 2005/0100788 A1* | 5/2005 | Sada | H01M 4/0416 429/217 |
| 2012/0094178 A1 | 4/2012 | Loveridge et al. | |
| 2013/0069601 A1* | 3/2013 | Coowar | H01M 4/38 429/331 |
| 2013/0149567 A1* | 6/2013 | Schaefer | H01M 4/13 429/50 |
| 2015/0109048 A1 | 4/2015 | Yang et al. | |

FOREIGN PATENT DOCUMENTS

| | | |
|---|---|---|
| CN | 103233246 A | 8/2013 |
| CN | 103531847 A | 1/2014 |
| KR | 1020140036660 A | 3/2014 |

OTHER PUBLICATIONS

Pradel, A., et al., "Ionic conductivity of chalcogenide glasses," p. 169-208, 2014.
Kozen, A.C., et al., "Next-Generation Lithium Metal Anode Engineering via Atomic Layer Deposition," ACS Nano, May 13, 2015, p. 1-30; downloaded from http://pubs.acs.org on May 17, 2015.
Chalcogenide, Wikipedia, p. 1-5, Apr. 2017.
Kamaya, N., et al., "A lithium superionic conductor." Nature Materials, vol. 10, 2011, p. 682-686.
Choi, S.J., et al., "In Situ Observation of Voltage-Induced Multilevel Resistive Switching in Solid Electrolyte Memory", Adv. Mater., 2011, v. 23, p. 3272-3277.
Dominic Lencer, et al., "A map for phase-change materials", nature materials, vol. 7, 2008, 6 pps.

* cited by examiner

*Primary Examiner* — Laura Weiner
(74) *Attorney, Agent, or Firm* — Cantor Colburn LLP (57) ABSTRACT

A lithium battery includes an anode, a cathode, and a protective film disposed on at least one of the anode and the cathode, in which the protective film includes a compound including: i) at least one element selected from a Group 13 element, a Group 14 element, a Group 15 element, and a first Group 16 element; and ii) a second Group 16 element, in which the first Group 16 element is different from the second Group 16 element.

20 Claims, 6 Drawing Sheets

LITHIUM BATTERY AND METHOD OF MANUFACTURING THE SAME

CROSS-REFERENCE TO RELATED APPLICATION

This application claims priority to and the benefit of Korean Patent Application No. 10-2016-0081169, filed on Jun. 28, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to lithium batteries and methods of manufacturing the same.

2. Description of the Related Art

Lithium batteries are high performance batteries having the highest energy density among commercially available secondary batteries, and may be used in various fields, for example, in electric vehicles.

A lithium (Li) metal foil may be used as an anode in a lithium battery. In this case, lithium may be react with a liquid electrolyte during charging and discharging of the battery due to a high reactivity of the Li and the liquid electrolyte. In addition, dendrites may be formed on the Li metal foil and thus the lifespan and stability of a lithium battery including the Li metal foil as an anode is poor. Therefore, there is still a need for an improved lithium battery.

SUMMARY

Provided is a lithium battery including a protective film, which may have improved lithium ion transferring ability.

Provided also are methods of manufacturing the lithium battery.

According to an aspect of an embodiment, a lithium battery includes an anode, a cathode, and a protective film disposed between the anode and the cathode, wherein the protective film includes a compound including: at least one element selected from a Group 13 element, a Group 14 element, a Group 15 element, and a first Group 16 element; and a second Group 16 element, wherein the first Group 16 element is different from the second Group 16 element.

According to an aspect of another embodiment, a method of manufacturing a lithium battery includes forming a protective film on a base, the compound including: at least one element selected from a Group 13 element, a Group 14 element, a Group 15 element, and a first Group 16 element; and a second Group 16 element, wherein forming the protection film comprises depositing the compound on the base to manufacture the lithium battery.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "(meth)acryl" includes any group containing the moiety $H_2C=CHRC(=O)-$ wherein R is hydrogen ("acryl group" herein) or methyl ("methacryl group" herein). "(Meth)acryl" includes the corresponding acids or salts thereof (referred to herein as "(meth)acrylic"), esters (referred to herein as "($C_1$-$C_{20}$alkyl) (meth)acrylate"), and amides (referred to herein as "(meth)acrylamide").

Hereinafter, a lithium battery according to an embodiment and a method of manufacturing the same, will be described in more detail.

According to an embodiment, a lithium battery includes an anode, a cathode, and a protective film disposed between the anode and the cathode, in which the protective film includes a compound including: i) at least one element selected from a Group 13 element, a Group 14 element, a Group 15 element, and a first Group 16 element, and ii) a second Group 16 element, in which the first Group 16 element is different from the second Group 16 element.

The protective film may be a cathode protective film or an anode protective film. In an embodiment, the protective film is an anode protective film.

The protective film may also serve as an electrolyte. According to an embodiment, the protective film may be a solid electrolyte. The lithium battery including such solid electrolyte may operate smoothly.

The elements of Groups 13 to 15 may include at least one selected from boron (B), carbon (C), nitrogen (N), aluminum (Al), silicon (Si), phosphorus (P), arsenic (As), indium (In), thallium (Tl), lead (Pb), bismuth (Bi), gallium (Ga), antimony (Sb), tin (Sn), and germanium (Ge), and the first Group 16 element may be at least one selected from polonium (Po), oxygen (O), and selenium (Se).

The compound including i) at least one selected from a Group 13 element, a Group 14 element, a Group 15 element, and a first Group 16 element and ii) a second Group 16 element may comprise, for example, at least one selected from $Sb_aTe_{1-a}$, $Ge_aTe_{1-a}$, $B_aTe_{1-a}$, $C_aTe_{1-a}$, $N_aTe_{1-a}$, $O_aTe_{1-a}$, $Al_aTe_{1-a}$, $Si_aTe_{1-a}$, $P_aTe_{1-a}$, $Sn_aTe_{1-a}$, $Ga_aTe_{1-a}$, $As_aTe_{1-a}$, $Se_aTe_{1-a}$, $In_aTe_{1-a}$, $Sn_aTe_{1-a}$, $Tl_aTe_{1-a}$, $Pb_aTe_{1-a}$, $Bi_aTe_{1-a}$, $Po_aTe_{1-a}$, $Ge_aTe_{1-a}$, and $Sb_aGe_bTe_{1-a-b}$. In the formulae, $0 \leq a < 1$ and $0 \leq b < 1$.

In the above formulae, each of a and b is independently 0.001 to 0.999.

According to an embodiment, a may be, for example, 0.01 to 0.9, or for example, 0.05 to 0.75, or for example, 0.1 to 0.5.

Li metal or a Li metal alloy has a high electric capacity per unit weight and thus a high-capacity lithium battery may be manufactured using Li metal or a Li metal alloy.

When an anode including Li metal or a Li metal alloy is used, however, dendrites may be formed during intercalation and/or deintercalation of lithium ions, causing a short circuit between a cathode and the anode. To prevent the occurrence of the short circuit, a protective film is formed on the anode. However, while some protective films for lithium batteries may have excellent mechanical and physical characteristics, the use of such films results in an increase in the interfacial resistance between the protective film and a Li metal anode. Or, while some protective films may have excellent strength, they may also have poor ductility and elasticity, and as a result, they do not have a satisfactory effect on suppressing the growth of lithium dendrites, resulting in reduced lifespan of a lithium battery.

To address the problems described above, a protective film according to an embodiment is provided.

The protective film functions as an insulating layer. When a voltage is applied between a cathode and an anode, with the protective film disposed therebetween, a bridge is formed between the cathode and the anode, which enables the transfer of lithium ions.

The compound including i) at least one element selected from a Group 13 element, a Group 14 element, a Group 15 element, and a first Group 16 element and ii) a second Group 16 element, may comprise at least one selected from SbTe, GeTe, BTe, CTe, NTe, OTe, AlTe, SiTe, PTe, SnTe, GaTe, AsTe, SeTe, InTe, SnTe, TlTe, PbTe, BiTe, PoTe, GeTe, SnTe, and SbGeTe. The amount of the at least one element selected from a Group 13 element, a Group 14 element, a Group 15 element, and a first Group 16 element, may be from about 0.1 moles to about 4 moles, for example, from about 0.5 to about 3 moles, or for example, from about 1 mole to about 2 moles, based on 1 mole of the second Group 16 element.

The compound including i) at least one element selected from a Group 13 element, a Group 14 element, a Group 15 element, and a first Group 16 element and ii) a second Group 16 element, may further include Li. In this regard, the amount of Li in the compound may be from about 0.01 parts by weight to about 20 parts by weight, for example, from about 0.1 to about 20 parts by weight, for example, or from about 10 parts by weight to about 15 parts by weight, based on 100 parts by weight of the compound.

The compound including i) at least one element selected from a Group 13 element, a Group 14 element, a Group 15 element, and a first Group 16 element and ii) a second Group 16 element, may comprise at least one selected from LiGeTe, LiSbTe, and LiSnTe.

The protective film may have an amorphous phase. When the protective film is amorphous, transfer of lithium ions is facilitated. According to another embodiment, the protective film may further have a crystalline phase. In an embodiment, the protective film includes both an amorphous phase and a crystalline phase. When the protective film includes both an amorphous phase and a crystalline phase, the amount of the crystalline phase may be about 20 volume percent (vol %) or less, or about 10 vol % or less, or about 5 vol % or less, based on a total volume of the protective film. For example, the amount of the crystalline phase may be from about 0.001 vol % to about 20 vol %, or from about 0.001 vol % to about 10 vol %, or from about 0.01 vol % to about 10 vol %, based on a total volume of the protective film.

The protective film may be fabricated using a deposition method.

The deposition method may be, for example, at least one selected from physical vapor deposition (PVD) and chemical vapor deposition (CVD).

Non-limiting examples of the physical vapor deposition and chemical vapor deposition methods include sputtering, pulsed laser deposition (PLD), molecular beam epitaxy (MBE), ion plating, and ion beam deposition.

The deposition method may be sputtering, and the sputtering may be, for example, direct current (DC) sputtering, radio frequency (RF) sputtering, magneton sputtering, bias sputtering, or reactive sputtering. In an embodiment, the sputtering is RF sputtering.

The foregoing description is not particularly limited, and various base supports, for example, a substrate, an anode, and the like, may be used according to manufacturing processes.

A method of forming a proton conductive inorganic thin film by RF sputtering, according to an embodiment, is described as below.

First, sputtering is performed using a sputter target. The sputter target may be a compound including i) at least one element selected from a Group 13 element, a Group 14 element, a Group 15, element, and a first Group 16 Element, and ii) a second Group 16 element.

In the sputtering process, as described above, the sputter target may include the compound including i) at least one element selected from a Group 13 element, a Group 14 element, a Group 15 element, and a first Group 16 Element, and ii) a second Group 16 element. In another embodiment, the sputter target may include a first sputter target including at least one element selected from a Group 13 element, a Group 14 element, a Group 15, element, and a first Group 16 Element, and a second sputter target including a second Group 16 element.

The sputtering process may be performed in a plasma gas atmosphere and at RF power of about 300 watts (W) to about 700 W, or for example, about 300 W to about 500 W, or for example, about 350 W to about 500 W; a power density of about 2.3 watts per square centimeter ($W/cm^2$) to about 2.7 $W/cm^2$, or for example, about 2.4 $W/cm^2$ to about 2.65 $W/cm^2$, or for example, about 2.5 $W/cm^2$ to about 2.6 $W/cm^2$; and a working pressure of about 2 millitorr (mTorr) to about 15 millitorr (mTorr), or for example, about 3 mTorr to about 10 mTorr, or for example, about 3 mTorr to about 9 mTorr. In this regard, the plasma gas atmosphere may include at least one selected from nitrogen gas, argon gas, and the like. In addition, a growth rate at which the protective film is formed on a support plate is controlled to be from about 0.3 angstroms per second (Å/sec) to about 0.4 Å/sec.

A distance between the sputter target and a substrate may be from about 25 millimeters (mm) to about 150 mm, or for example, from about 50 mm to about 130 mm, or for example, from about 50 mm to about 120 mm, and a deposition time may be from about 50 minutes to about 2,000 minutes, or for example, from about 75 minutes to about 1,500 minutes, or for example, from about 100 minutes to about 1,000 minutes.

When the sputtering conditions satisfy the ranges described above, a compact protective film may be formed. In addition, an amorphous and compact anode protective film may be formed.

The sputtering process may, or may not, be followed by heat treatment. In an embodiment, the sputtering process is not followed by a heat treatment.

In another embodiment, after the sputtering process, heat treatment may be performed. The heat treatment may be performed at a temperature of about 250° C. or less, or about 200° C. or less, or about 180° C. or less, for example, a temperature ranging from about 50° C. to about 250° C., or for example, from about 55 C to about 200° C., or for example, from about 60° C. to about 180° C. As such, after the heat treatment, the protective film may have a mixed structure including both an amorphous phase and a crystalline phase. When the protective film has a crystalline phase in addition to an amorphous phase, the protective film may have reduced ionic conductivity.

According to an embodiment, an amorphous protective film may be obtained according to the deposition process described above.

The thickness of the protective film may be from about 0.1 nanometer (nm) to about 30 nm, for example, from about 0.1 nm to about 20 nm, or for example, from about 1 nm to about 15 nm. In this regard, a thickness deviation of the protective film may be about 5% or less, for example, from about 0.01% to about 5%. When the thickness and thickness deviation of the protective film are within the ranges described above, lithium ions may transfer smoothly.

When the protective film having the thickness within the above range is used, a lithium battery including the protective film has a lower loss in energy density and a longer lifespan as compared to a lithium battery including a thicker protective film.

The protective film may be suitable for use as an anode protective film in a lithium battery. For example, the protective film is suitable for use as a protective film for an anode including Li metal or a Li metal alloy.

The protective film may also serve as an electrolyte in the lithium battery.

The protective film may further include a liquid electrolyte.

When the protective film includes a liquid electrolyte, an ion conductive path may be formed in the protective film and thus the anode has enhanced conductivity. In addition, a lithium battery having stable cycle characteristics may be manufactured using the protective film.

The liquid electrolyte includes at least one selected from an organic solvent, an ionic liquid, a polymer ionic liquid, and a lithium salt.

The organic solvent may be at least one selected from a carbonate-based compound, a glyme-based compound, a dioxolane-based compound, or the like.

The carbonate-based compound may be at least one selected from ethylene carbonate, propylene carbonate, dimethyl carbonate, fluoroethylene carbonate, diethyl carbonate, and ethyl methyl carbonate.

The glyme-based compound may be at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly (ethylene glycol) monoacrylate (PEGMA), and poly(ethylene glycol) diacrylate (PEGDA).

The dioxolane-based compound may be at least one selected from 3-dioxolane, 4,5-diethyl-dioxolane, 4,5-dimethyl-dioxolane, 4-methyl-1,3-dioxolane, and 4-ethyl-1,3-dioxolane.

Non-limiting examples of the organic solvent include 2,2-dimethoxy-2-phenylacetophenone, dimethyl ether (DME), 1,2-dimethoxyethane, 1,2-diethoxyethane, tetrahydrofuran, γ-butyrolactone, and 1,1,2,2-tetrafluoroethyl 2,2,3,3-tetrafluoropropyl ether.

The organic solvent may be at least one selected from ethylene carbonate, propylene carbonate, dimethyl carbonate, diethyl carbonate, ethyl methyl carbonate, fluoroethylene carbonate, γ-butyrolactone, 1,2-dimethoxyethane, 1,2-diethoxyethane, dimethylene glycol dimethyl ether, trimethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, and 1,1,2,2-tetrafluoroethyl 2,2,3,3-tetrafluoropropyl ether.

The term "ionic liquid" as used herein refers to a salt which is in the liquid state at room temperature or to a room-temperature molten salt that has a melting point that is equal to or less than room temperature (25° C.) and is composed solely of ions. The ionic liquid may be a compound including at least one cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, and a triazolium-based cation; and at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

The ionic liquid may be, for example, at least one selected from N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide.

The amount of the ionic liquid may be from about 5 parts by weight to about 40 parts by weight, or for example, about 5 parts by weight to about 30 parts by weight, or for example, from about 10 parts by weight to about 20 parts by weight, based on 100 parts by weight of solid particles in the protective film. When the amount of the ionic liquid is within these ranges, a protective film having excellent ionic conductivity and mechanical and physical properties may be obtained.

When the protective film includes an ionic liquid and a lithium salt, a molar ratio (IL/Li) of ionic liquid (IL) to lithium ions (Li) may be from about 0.1 to about 2, for example, from about 0.2 to about 1.8, for example, from about 0.4 to about 1.5. When the ionic liquid and lithium salt are present in the above-described molar ratios, the protective film has high lithium ion mobility and ionic conductivity, as well as excellent mechanical and physical properties. The protective film is also capable of effectively suppressing the growth of lithium dendrites at a surface of an anode.

The polymer ionic liquid may be a polymer ionic liquid obtained by polymerization of one or more ionic liquid monomers. Alternatively, the polymer ionic liquid may be a polymer ionic liquid including a compound which is already in a polymer form. The polymer ionic liquid has a high solubility for an organic solvent and may have increased ionic conductivity when added to an electrolyte.

With regard to the polymer ionic liquid obtained by polymerization of ionic liquid monomers, the polymer product obtained after the polymerization reaction is washed and dried, followed by an anion substitution reaction to prepare an anion capable of imparting solubility to an organic solvent.

The polymer ionic liquid may have a repeating unit including at least one cation selected from ammonium-based cations, pyrrolidinium-based cations, pyridinium-based cations, pyrimidinium-based cations, imidazolium-based cations, piperidinium-based cations, pyrazolium-based cations, oxazolium-based cations, pyridazinium-based cations, phosphonium-based cations, sulfonium-based cations, and triazolium-based cations; and at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In another embodiment, the polymer ionic liquid may be prepared by polymerizing ionic liquid monomers. The ionic liquid monomers have a functional group that is polymerizable with a vinyl group, an allyl group, a (meth)acryl group, or the like and may also have the aforementioned anion and at least one cation selected from ammonium-based cations, pyrrolidinium-based cations, pyridinium-based cations, pyrimidinium-based cations, imidazolium-based cations, piperidinium-based cations, pyrazolium-based cations, oxazolium-based cations, pyridazinium-based cations, phosphonium-based cations, sulfonium-based cations, and triazolium-based cations.

Examples of the ionic liquid monomers include at least one selected from 1-vinyl-3-ethylimidazolium bromide and compounds represented by Formulae 1 and 2 below:

Formula 1

Formula 2

The polymer ionic liquid described above may be, for example, a compound represented by Formula 3 below or a compound represented by Formula 4 below:

Formula 3 wherein, in Formula 3, each of $R_1$ and $R_3$ is independently hydrogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_2$-$C_{30}$ heteroaryl group, or a substituted or unsubstituted $C_4$-$C_{30}$ carbocyclic group;

$R_2$ is a chemical bond, a $C_1$-$C_3$ alkylene group, a $C_6$-$C_{30}$ arylene group, a $C_2$-$C_{30}$ heteroarylene group, or a $C_4$-$C_{30}$ carbocyclic group;

$X^-$ is an anion of an ionic liquid; and n is 500 to 2800.

Formula 4 wherein, in Formula 4, $Y^-$ is an anion of an ionic liquid, and n is 500 to 2800.

In Formula 4 above, $Y^-$ may be, for example, bis(trifluoromethanesulfonyl)imide (TFSI), bis(fluoromethanesulfonyl)imide, $BF_4$, or $CF_3SO_3$.

The polymer ionic liquid includes, for example, at least one cation selected from poly(1-vinyl-3-alkylimidazolium), poly(1-allyl-3-alkylimidazolium), and poly(1-(methacryloyloxy-3-alkylimidazolium), and at least one anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

The compound of Formula 4 may be, for example, polydiallyldimethylammonium bis(trifluoromethanesulfonyl)imide.

In another embodiment, the polymer ionic liquid may include a low molecular weight polymer, a thermally stable ionic liquid, and a lithium salt. The low molecular weight polymer may have an ethylene oxide chain. The low molecular weight polymer may be glyme. Examples of the glyme include poly(ethylene glycol) dimethyl ether (polyglyme), tetra(ethylene glycol) dimethyl ether (tetraglyme), and tri(ethylene glycol) dimethyl ether (triglyme).

The low molecular weight polymer may have a weight average molecular weight of about 75 grams per mole (g/mol) to about 2000 g/mol, for example, about 100 g/mol to about 1000 g/mol, for example, about 250 g/mol to about 500 g/mol. The thermally stable ionic liquid is defined the same as for the ionic liquid described above. The lithium salt may be any one of the alkali metal salts described above in which an alkali metal is lithium.

The protective film may further include an oligomer. The oligomer may be at least one selected from polyethylene glycol dimethyl ether and polyethylene glycol diethyl ether. The oligomer may have a weight average molecular weight of about 200 to about 2,000, for example, about 100 g/mol to about 1000 g/mol, for example, about 250 g/mol to about 500 g/mol, and the amount of the oligomer may be from about 1 part by weight to about 100 parts by weight, for example, about 5 parts by weight to about 75 parts by weight, for example, about 5 parts by weight to about 50 parts by weight, based on 100 parts by weight of the solid particles in the protective film. As such, when the protective film further includes an oligomer, the protective film has enhanced film-formation properties, enhanced mechanical and physical properties, and enhanced ionic conductivity.

The protective film may have an ionic conductivity of about $1 \times 10^{-4}$ Siemen per centimeter (S/cm) or more, for example, about $5 \times 10^{-4}$ S/cm or more, for example, about $1 \times 10^{-3}$ S/cm or more, as measured at a temperature of about 25° C.

The type of lithium battery is not limited, and may be, for example, a lithium air battery, a Li-ion battery, a lithium polymer battery, a lithium sulfur battery, or the like.

The protective film is suitable for use as an anode protective film for a high-voltage lithium battery. In this regard, the term "high voltage" indicates a charging voltage ranging from about 4 volts (V) to about 5.5 V.

Figure 1A:
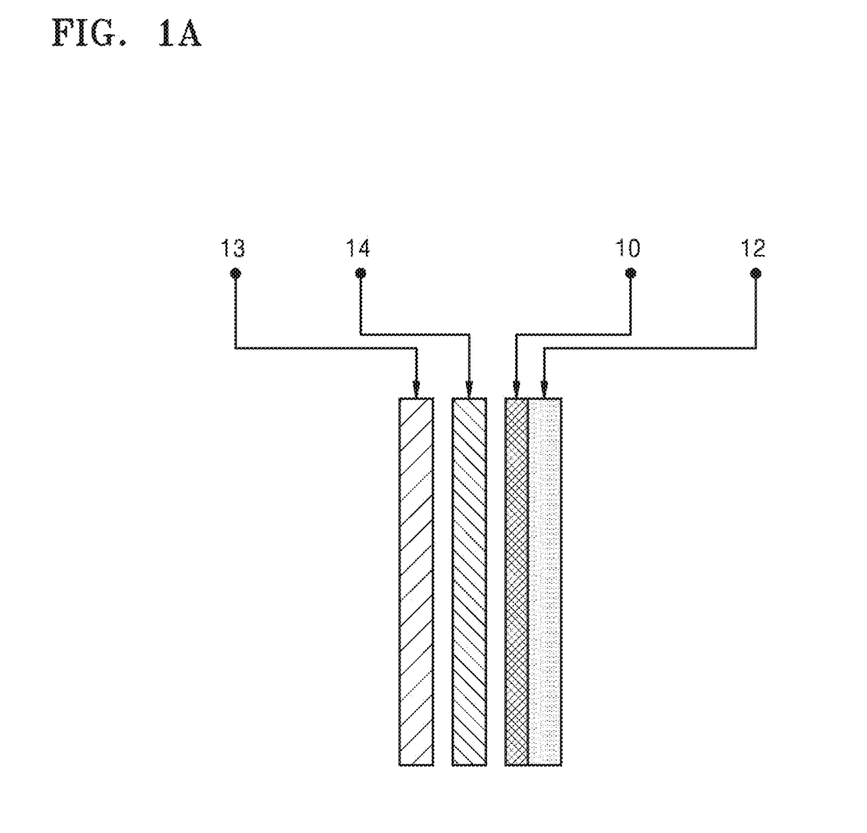
FIG. 1A is a schematic view illustrating a structure of a lithium battery including an anode protective film, according to an embodiment.

FIG. 1A is a schematic view illustrating a structure of a lithium battery including an anode protective film 10, according to an embodiment.

Referring to FIG. 1A, a lithium battery includes the anode protective film 10 disposed on an anode 12, and a separator 14 and a cathode 13 that are disposed on the anode protective film 10.

The anode 12 may be, for example, an electrode including Li metal or a Li metal alloy.

In FIG. 1A, the anode protective film 10 is disposed on the anode 12 and thus serves as a film for protecting the anode 12. In another embodiment, a protective film may be disposed on the cathode 13 and thus serves as a cathode protective film.

Figure 1B:
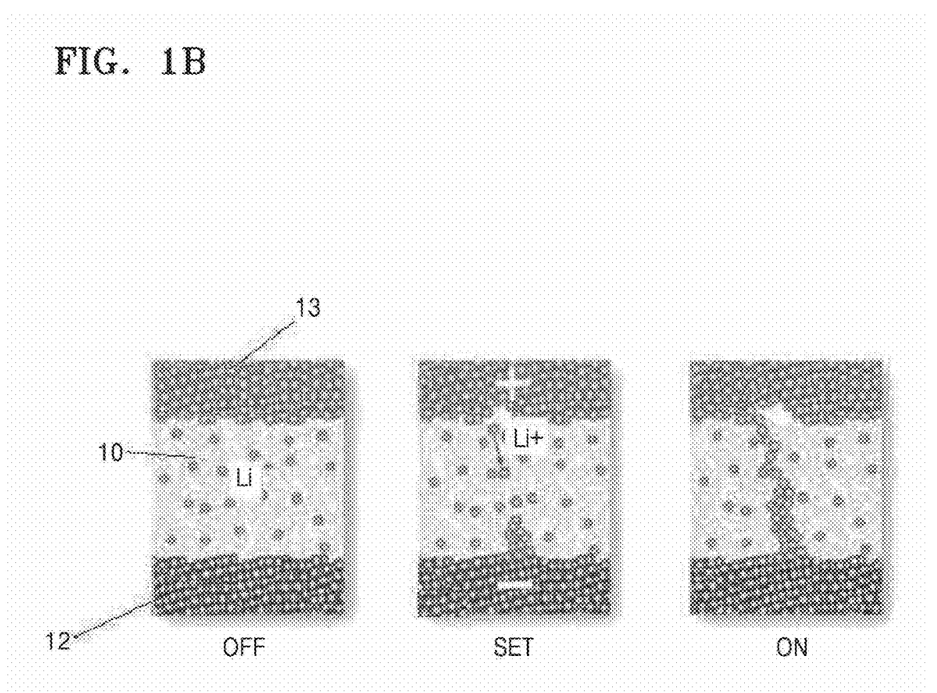
FIG. 1B illustrates the formation of a lithium ion path in a battery including an anode protective film, according to an embodiment.

As illustrated in FIG. 1B, the anode protective film 10 has insulating properties. When a voltage is applied between the cathode 13 and the anode 12, with the anode protective film 10 disposed therebetween, a Li ion ($Li^+$) path is formed in the anode protective film 10 such that the Li ion path forms a bridge between the cathode 13 and the anode 12.

Hereinafter, a lithium battery according to another embodiment will be described in more detail.

The lithium battery includes a cathode, an anode, and a protective film disposed on the cathode or the anode.

The protective film may also serve as an electrolyte as described above. Thus, the lithium battery may be capable of operating without a separate electrolyte and/or a separator.

A cathode active material for the fabrication of a cathode may be at least one selected from lithium cobalt oxide, lithium nickel cobalt manganese oxide, lithium nickel cobalt aluminum oxide, lithium iron phosphate, and lithium manganese oxide, but is not limited thereto. Any cathode active material suitable for use in a lithium battery may be used.

For example, the cathode active material may be at least one compound represented selected from the following formulae: $Li_aA_{1-b}B'_bD_2$, where $0.90 \le a \le 1.8$ and $0 \le b \le 0.5$; $Li_aE_{1-b}B'_bO_{2-c}D_c$, where $0.90 \le a \le 1.8$, $0 \le b \le 0.5$, and $0 \le c \le 0.05$; $LiE_{2-b}B'_bO_{4-c}D_c$, where $0 \le b \le 0.5$ and $0 \le c \le 0.05$; $Li_aNi_{1-b-c}Co_bB'_cD_\alpha$, where $0.90 \le a \le 1.8$, $0 \le c \le 0.05$, and $0 < \alpha \le 2$; $Li_aNi_{1-b-c}Co_bB'_cO_{2-\alpha}F'_\alpha$, where $0.90 \le a \le 1.8$, $0 \le c \le 0.05$, and $0 < \alpha < 2$; $Li_aNi_{1-b-c}Co_bB'_cO_{2-\alpha}F'_\alpha$, where $0.90 \le a \le 1.8$, $0 \le b \le 0.5$, $0 \le c \le 0.05$, and $0 < \alpha < 2$; $Li_aNi_{1-b-c}Mn_bB'_cD_\alpha$, where $0.90 \le a \le 1.8$, $0 \le b \le 0.5$, $0 \le c \le 0.05$, and $0 < \alpha \le 2$; $Li_aNi_{1-b-c}Mn_bB'_cO_{2-\alpha}F'_\alpha$, where $0.90 \le a \le 1.8$, $0 \le b \le 0.5$, $0 \le c \le 0.05$, and $0 < \alpha < 2$; $Li_aNi_{1-b-c}Mn_bB'_cO_{2-\alpha}F'_\alpha$, where $0.90 \le a \le 1.8$, $0 \le b \le 0.5$, $0 \le c \le 0.05$, and $0 < \alpha < 2$; $Li_aNi_bE_cG_dO_2$, where $0.90 \le a \le 1.8$, $0 \le b \le 0.9$, $0 \le c \le 0.5$, and $0.001 \le d \le 0.1$; $Li_aNi_bCo_cMn_dGeO_2$, where $0.90 \le a \le 1.8$, $0 \le b \le 0.9$, $0 \le c \le 0.5$, $0 \le d \le 0.5$, and $0.001 \le e \le 0.1$; $Li_aNiG_bO_2$, where $0.90 \le a \le 1.8$ and $0.001 \le b \le 0.1$; $Li_aCoG_bO_2$, where $0.90 \le a \le 1.8$ and $0.001 \le b \le 0.1$; $Li_aMnG_bO_2$, where $0.90 \le a \le 1.8$ and $0.001 \le b \le 0.1$; $Li_aMn_2G_bO_4$, where $0.90 \le a \le 1.8$ and $0.001 \le b \le 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$, where $0 \le f \le 2$; and $Li_{(3-f)}Fe_2(PO_4)_3$, where $0 \le f \le 2$; and $LiFePO_4$.

In the formulae above, A is at least one selected from nickel (Ni), cobalt (Co), and manganese (Mn); B' is selected from at least one aluminum (Al), nickel (Ni), cobalt (Co), manganese (Mn), chromium (Cr), iron (Fe), magnesium (Mg), strontium (Sr), vanadium (V), and a rare earth element; D is selected from at least one oxygen (O), fluorine (F), sulfur (S), and phosphorus (P); E is at least one selected from cobalt (Co) and manganese (Mn); F' is at least one selected from fluorine (F), sulfur (S), and phosphorus (P); G is at least one selected from aluminum (Al), chromium (Cr), manganese (Mn), iron (Fe), magnesium (Mg), lanthanum (La), cerium (Ce), strontium (Sr), and vanadium (V); Q is at least one selected from titanium (Ti), molybdenum (Mo), and manganese (Mn); I' is at least one selected from chromium (Cr), vanadium (V), iron (Fe), scandium (Sc), and yttrium (Y); and J is at least one selected from vanadium (V), chromium (Cr), manganese (Mn), cobalt (Co), nickel (Ni), and copper (Cu).

The cathode active material may be, for example, at least one selected from compounds represented by Formulae 5 to 8 below:

$$Li_aNi_bCo_cMn_dO_2 \qquad \text{Formula 5}$$

wherein, in Formula 5, $0.90 \le a \le 1.8$, $0 \le b \le 0.9$, $0 \le c \le 0.5$, and $0 \le d \le 0.5$, $$Li_2MnO_3 \qquad \text{Formula 6}$$

wherein, in Formula 6, M is Mn, Fe, Co, or Ni, $$LiMO_2 \qquad \text{Formula 7}$$

wherein, in Formula 7, M is Mn, Fe, Co, or Ni, $$Li_aNi_bCo_cAl_dO_2 \qquad \text{Formula 8}$$

wherein, in Formula 8, $0.90 \le a \le 1.8$, $0 \le b \le 0.9$, $0 \le c \le 0.5$, and $0 \le d \le 0.5$.

A cathode is prepared according to the following method.

A cathode active material composition is prepared by mixing a cathode active material, a binder, and a solvent.

The cathode active material composition may further include a conductive agent.

The cathode active material composition may be directly coated on a metal current collector and dried to manufacture a cathode plate. In another embodiment, the cathode active material composition may be cast on a separate support and a film separated from the support may be laminated on a metal current collector, thereby completing the manufacture of a cathode plate.

The binder is a component which assists in binding between an active material and a conductive agent and in binding of the active material to a current collector. The binder may be added in an amount of about 1 part by weight to about 50 parts by weight based on 100 parts by weight of the cathode active material. Non-limiting examples of the binder include at least one selected from polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers. The amount of the binder in the cathode active material composition may be from about 2 parts by weight to about 5 parts by weight based on 100 parts by weight of the cathode active material. When the amount of the binder is within the above range, binding of an active material layer to a current collector is satisfactory.

The conductive agent is not particularly limited so long as it does not cause chemical changes in the fabricated battery and has conductivity. Non-limiting examples of the conductive agent include at least one selected from graphite such as natural or artificial graphite; carbonaceous materials such as carbon black, acetylene black, Ketjen black, channel black, furnace black, lamp black, and thermal black; conductive fibers such as carbon fibers and metallic fibers; metal powders such as carbon fluoride powder, aluminum powder, and nickel powder; conductive whiskers such as zinc oxide and potassium titanate; conductive metal oxides such as titanium oxide; and polyphenylene derivatives.

The amount of the conductive agent in the cathode active material composition may be from about 1 part by weight to about 10 parts by weight, for example, from about 2 parts by weight to about 5 parts by weight, based on 100 parts by weight of the cathode active material. When the amount of the conductive agent is within the above ranges, the final electrode has high conductivity.

The solvent may be, for example, N-methylpyrrolidone or the like.

The amount of the solvent in the cathode active material composition may be from about 100 parts by weight to about 2000 parts by weight, based on 100 parts by weight of the cathode active material. When the amount of the solvent is within the above range, the cathode active material layer is easily formed.

The amounts of the cathode active material, the conductive agent, the binder, and the solvent in the cathode active material composition may be the same level as those used in a general lithium battery. At least one of the conductive agent, the binder, and the solvent may not be included according to the desired use and constitution of lithium batteries.

The anode may be, as described above, a Li metal foil or a Li metal alloy foil.

The Li metal alloy may include lithium and at least one metal/metalloid alloyable with lithium. For example, the metal/metalloid alloyable with lithium may be at least one selected from silicon (Si), tin (Sn), aluminum (Al), germanium (Ge), lead (Pb), bismuth (Bi), antimony (Sb), a Si-yttrium (Y) alloy (wherein Y is at least one selected from an alkali metal, an alkali earth metal, a Group 13 element, a Group 14 element, a Group 15 element, a Group 16 element, a transition metal, and a rare earth element, except for Si), a Sn—Y alloy (wherein Y is at least one selected from an alkali metal, an alkali earth metal, a Group 13 element, a Group 14 element, a transition metal, and a rare earth element, except for Sn), or the like. Examples of Y may include at least one selected from magnesium (Mg), calcium (Ca), strontium (Sr), barium (Ba), radium (Ra), scandium (Sc), yttrium (Y), Ti, zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), and polonium (Po).

The lithium battery may further include a separator. The separator may be a single layer of polyethylene, polypropylene, or polyvinylidene fluoride, or may be multiple layers of at least two of these materials. The separator generally has a pore diameter of about 0.01 micrometers (μm) to about 10 μm and a thickness of about 5 μm to about 20 μm.

The separator may be, for example, multiple layers of different materials, such as a polyethylene/polypropylene, a polyethylene/polypropylene/polyethylene, a polypropylene/polyethylene/polypropylene, or the like. An electrolyte including a lithium salt and an organic solvent may further be added to the separator.

The lithium battery may further include at least one selected from a liquid electrolyte, a gel electrolyte, and a solid electrolyte.

The gel electrolyte is an electrolyte in a gel state and may be any gel electrolyte which is suitable for use in a lithium battery. The gel electrolyte may include, for example, a polymer and a polymer ionic liquid. In this regard, the polymer may be, for example, a solid graft copolymer, or a solid block copolymer.

The solid electrolyte may be an organic solid electrolyte or an inorganic solid electrolyte.

Non-limiting examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

The inorganic solid electrolyte may be at least one selected from $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$, $Cu_3N$, LiPON, $Li_2S.GeS_2.Ga_2S_3$, $Li_2O.11Al_2O_3$, $(Na, Li)_{1+x}Ti_{2-x}Al_x(PO_4)_3$ (where $0.1 \leq x \leq 0.9$), $Li_{1+x}Hf_{2-x}Al_x(PO_4)_3$ (where $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-silicates, $Li_{0.3}La_{0.5}TiO_3$, $Na_5MSi_4O_{12}$ (where M is a rare earth element such as Nd, Gd, Dy, or the like) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (where $x \leq 0.8$ and $0 \leq y \leq 1.0$, M is Nd, Sm, Eu, Gd, Tb, Dy, Ho, Er, Tm, or Yb), $Li_{1+x+y}Q_xTi_{2-x}Si_yP_{3-y}O_{12}$ (where $0 < x \leq 0.4$, $0 < y \leq 0.6$), Q is Al or Ga, $Li_6BaLa_2Ta_2O_{12}$, $Li_7La_3Zr_2O_{12}$, $Li_5La_3Nb_2O_{12}$, $Li_5La_3M_2O_{12}$ (where M is Nb or Ta), $Li_{7+x}A_xLa_{3-x}Zr_2O_{12}$ (where $0 < x < 3$ and A is Zn), and the like.

The liquid electrolyte includes an organic solvent and a lithium salt. The organic solvent may be any organic solvent used in the art. The organic solvent may be, for example, at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, fluoroethylene carbonate, benzonitrile, acetonitrile, tetrahydrofuran, 2-methyl tetrahydrofuran, γ-butyrolactone, 1,3-dioxolane, 4-methyldioxolane, N,N-dimethylformamide, N,N-dimethylacetamide, dimethyl sulfoxide, dioxane, 1,2-dimethoxy ethane, sulfolane, dichloroethane, chlorobenzene, nitrobenzene, diethylene glycol, and dimethyl ether. The lithium salt may be, for example, at least one selected from $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO2)(C_yF_{2y+1}SO_2)$ where x and y are natural numbers, LiCl, and LiI.

In addition, in order to enhance charge/discharge characteristics and flame retardancy, other materials may be added, for example, at least one selected from pyridine, triethylphosphite, triethanolamine, cyclic ether, ethylenediamine, n-glyme, hexamethylphosphoramide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, and the like may be added. In some embodiments, in order to impart flame retardant properties, the electrolyte may further include a halogen-containing solvent such as carbon tetrachloride, ethylene trifluoride, or the like.

Figure 2:
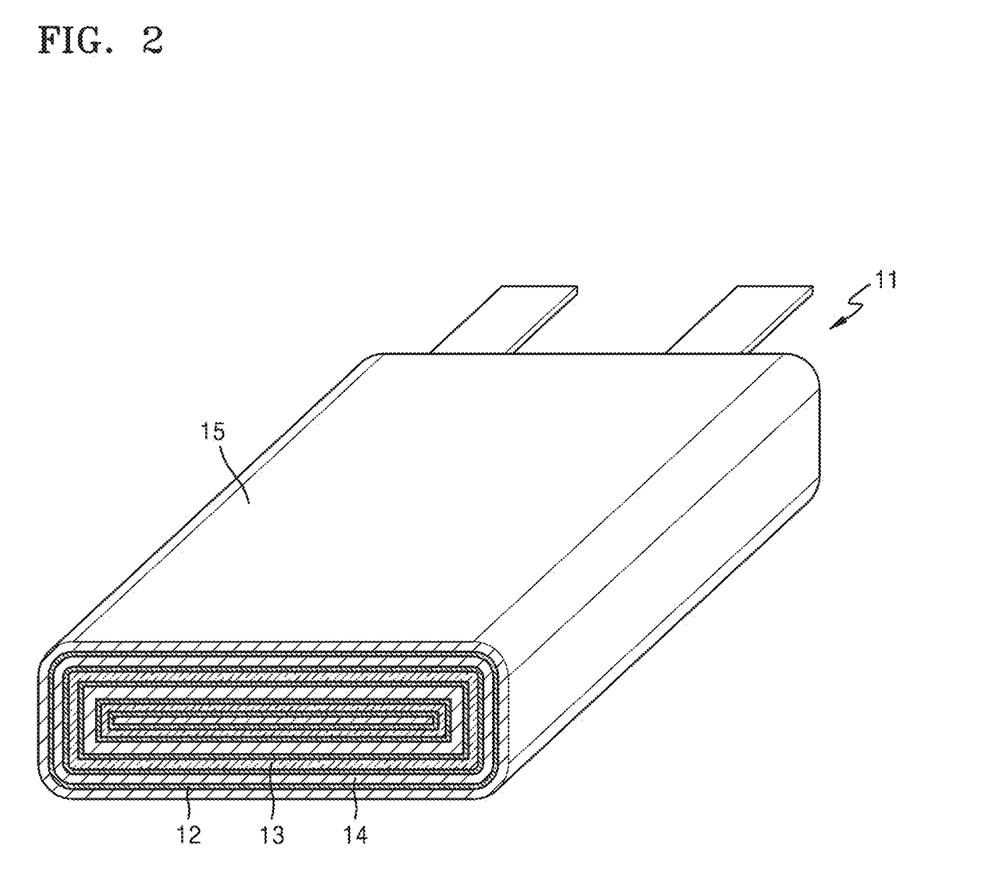
FIG. 2 is a view illustrating a structure of a lithium battery, according to an embodiment.

Next, a lithium battery 11 is assembled. FIG. 2 is a schematic diagram of a lithium battery according to an embodiment. Referring to FIG. 2, a lithium battery 1 may include a cathode 13, an anode 12, and a separator 14. The cathode 13, the anode 12, and the separator 14 as described above may be wound, stacked, or folded, and then accommodated in a battery case 15. Subsequently, an organic electrolyte solution may be injected into the battery case 15. Although not shown in FIG. 2, the protective film may be disposed on a surface of the cathode 13 and/or on a surface of the anode 12. The battery case 25 may have a cylindrical, rectangular, pouch, or thin film shape.

The lithium battery has high capacity and long lifespan and thus may be used in battery cells which are used as a power source for small-scale devices, and may also be used as a unit battery in medium- and large-scale battery packs or battery modules which are used as a power source for medium and large-scale devices.

Non-limiting examples of the medium and large-scale devices include electric vehicles (EVs), hybrid EVs (HEVs), plug-in HEVs (PHEVs), electric two-wheel vehicles (E-bikes and E-scooters), motor-driven tools, and power storage devices.

One or more example embodiments will now be described in further detail with reference to the following examples and comparative examples. These examples are for illustrative purposes only and are not intended to limit the scope of the one or more example embodiments.

EXAMPLES

Example 1

A GeTe protective film having a thickness of about 10 nm was formed on a Li metal foil having a thickness of about 20 μm by RF sputtering using a GeTe target, under the manufacturing conditions shown in Table 1, thereby completing the fabrication of an anode including the GeTe protective film on the Li metal foil.

TABLE 1

| | Conditions |
|---|---|
| RF power | 450 W |
| Power density | 2.54 W/cm$^2$ |
| Working pressure | 3 mTorr |
| Plasma gas | N$_2$ 100 sccm |
| Growth rate | about 0.35 Å/sec |

Separately, LiCoO$_2$, SUPER-P® as a conductive agent (carbon black, available from Timcal Ltd.), polyvinylidene fluoride (PVdF), and N-methylpyrrolidone were mixed to obtain a cathode active material layer-forming composition. In the cathode active material layer-forming composition, a mixed weight ratio of LiCoO$_2$ to conductive agent to PVDF was 97:1.5:1.5.

The cathode active material layer-forming composition was coated on an aluminum foil having a thickness of about 15 μm and dried at 25° C. and then the dried resultant was dried in a vacuum at about 110° C., thereby completing the fabrication of a cathode.

Thereafter, a polyethylene separator (porosity: about 48%) was disposed between the cathode and the anode (thickness: about 20 μm) obtained according to the processes described above, thereby completing the manufacture of a lithium battery (coin cell). In this regard, a liquid electrolyte was injected between the cathode and the Li metal anode. As the liquid electrolyte, an electrolytic solution including 1.0 M LiN(SO$_2$F)$_2$ (LiFSI) dissolved in a mixed solvent of fluoroethylene carbonate (FEC) and diethyl carbonate (DEC) in a volume ratio of 6:4, was used.

Examples 2 and 3

Anodes and coin cells were manufactured in the same manner as in Example 1, except that the thicknesses of the GeTe protective films were about 15 nm (Example 2) and about 5 nm (Example 3).

Examples 4 to 6

An anode and a lithium battery (coin cell) were manufactured in the same manner as in each of Examples 1 to 3, except that the RF sputtering process was performed using a SbTe target instead of the GeTe target.

Examples 7 to 9

An anode and a lithium battery (coin cell) were manufactured in the same manner as in each of Examples 1 to 3, except that the RF sputtering process was performed using a SnTe target instead of the GeTe target.

Example 10: Manufacture of Coin Cell

A protective film having a thickness of about 15 nm was formed and an anode including the same and a lithium battery (coin cell) were manufactured in the same manner as in Example 1, except that the RF sputtering process was performed using a LiAlTe target instead of the GeTe target.

Example 11: Manufacture of Coin Cell

A protective film having a thickness of about 15 nm formed and an anode including the same and a lithium battery (coin cell) were manufactured in the same manner as in Example 1, except that the RF sputtering process was performed using a LiGeTe target instead of the GeTe target.

Example 12

A platinum layer was formed on a silicon substrate and sputtering was performed thereon using a GeTe target, thereby forming a GeTe protective film having a thickness of about 200 nm.

Comparative Example 1

A lithium battery (coin cell) was manufactured in the same manner as in Example 1, except that a protective film was not formed on the Li metal foil.

Evaluation Example 1: Scanning Electron Microscope (SEM)

Figure 3:
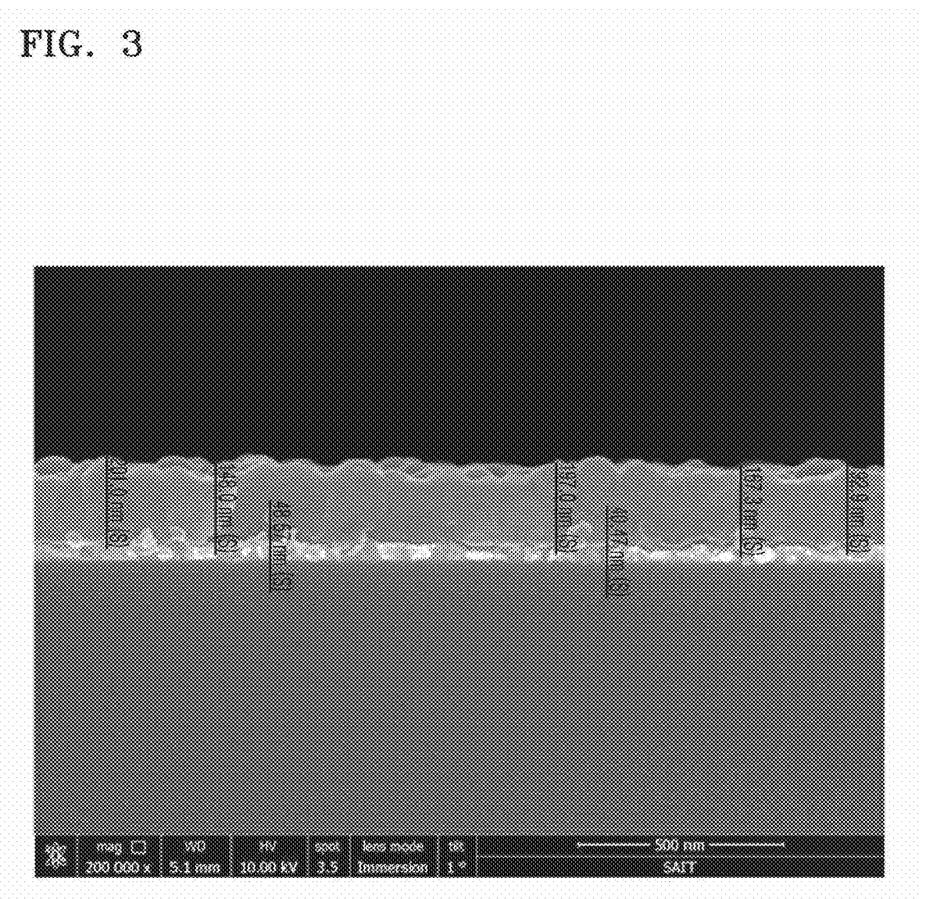
FIG. 3 is a scanning electron microscope (SEM) image of a protective film formed in accordance with Example 12.

The protective film manufactured according to Example 12 was analyzed using an SEM. The SEM analysis results are shown in FIG. 3. In this regard, the SU-8030 manufactured by Hitachi was used as an SEM.

Referring to FIG. 3, it is confirmed that the thickness of the GeTe protective film of Example 12 formed on the support plate was relatively uniform.

Evaluation Example 2: Lifespan Characteristics

1) Example 1 and Comparative Example 1

Figure 4:
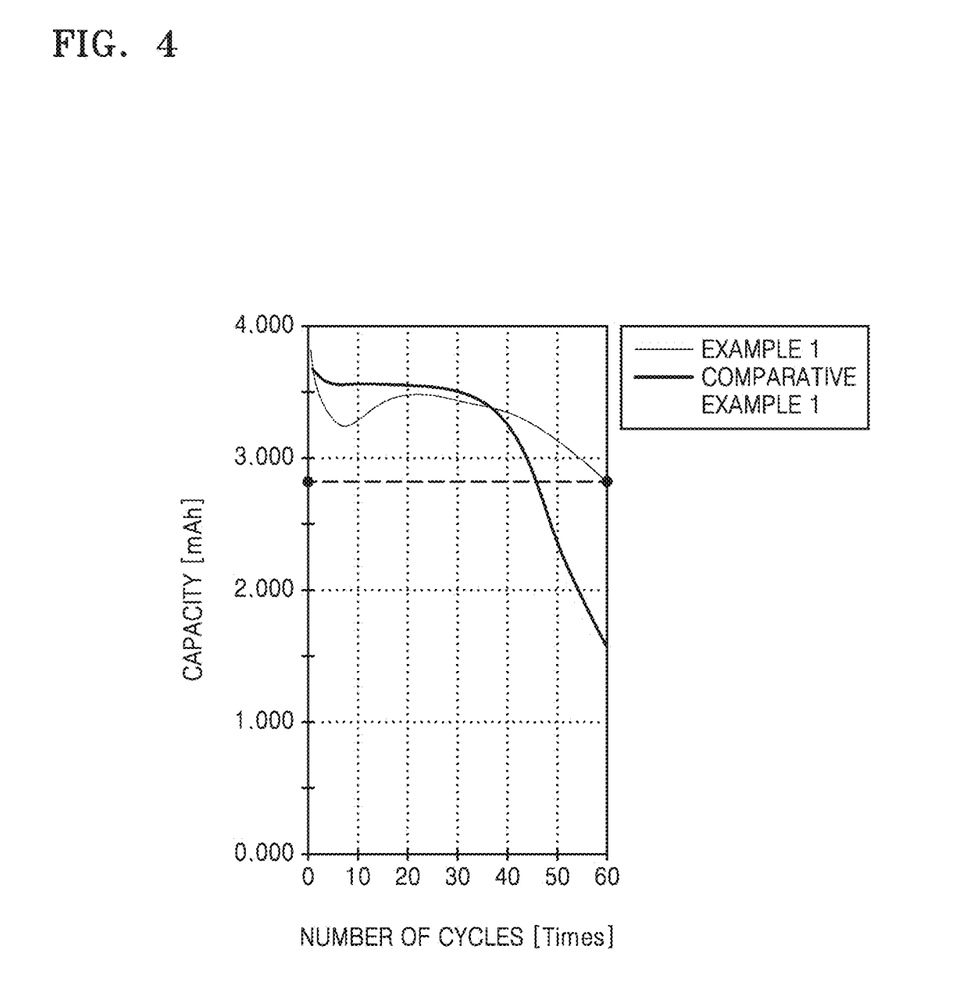
FIG. 4 is a graph of capacity (milliampere, mAh) versus cycle number showing the charge/discharge characteristics of coin cells manufactured according to Example 1 and Comparative Example 1.

Charge/discharge characteristics of the coin cells manufactured according to Example 1 and Comparative Example 1 were evaluated according to the following method and the evaluation results are shown in FIG. 4.

Each of the coin cells of Example 1 and Comparative Example 1 were charged at a constant current of 0.1 C rate and 25° C. until the voltage reached 4.40 V (vs. Li) and was then cut off at 0.05 C rate while maintaining a constant voltage of 4.40 V. Subsequently, each coin cell was discharged at a constant current of 0.1 C rate until the voltage reached 2.8 V (vs. Li) (formation process, 1$^{st}$ cycle). The cycle of charging and discharging was repeated twice more, thereby completing the formation process. The C rate is a discharge rate of a cell, and is obtained by dividing a total capacity of the cell by a total discharge period of time, e.g., a C rate for a battery having a discharge capacity of 1.6 ampere-hours would be 1.6 amperes.

After the formation process, each coin cell was charged at a constant current of 0.7 C, room temperature (25° C.) and a voltage ranging from about 3.0 V to about 4.4 V (vs. Li metal) and was then discharged at a constant current of 0.5 C until a cut-off voltage reached 4.4 V.

The charging and discharging processes described above were repeated 59 times and thus were performed a total 60 times. Changes in discharge capacity according to charging and discharging cycles are shown in FIG. 4.

Referring to FIG. 4, the coin cell of Example 1 exhibited a longer lifespan than that of the coin cell of Comparative Example 1.

2) Example 4 and Comparative Example 1

Figure 5:
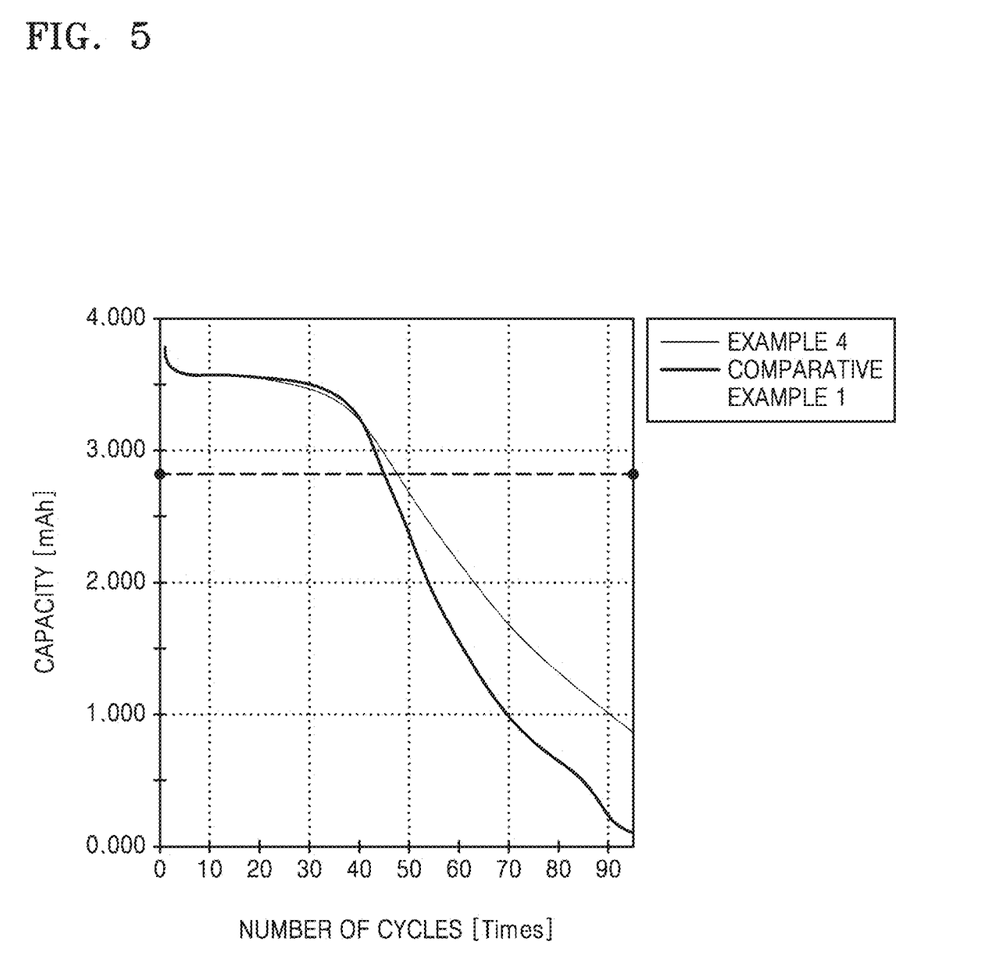
FIG. 5 is a graph of capacity (mAh) versus cycle number showing charge/discharge characteristics of coin cells manufactured according to Example 4 and Comparative Example 1.

Charge/discharge characteristics of the coin cells manufactured according to Example 4 and Comparative Example 1 were evaluated using the same method as that used for the coin cell of Example 1 and the evaluation results are shown in FIG. 5.

Referring to FIG. 5, the coin cell of Example 4 exhibited a longer lifespan than that of the coin cell of Comparative Example 1.

Evaluation Example 3: Lifespan Characteristics

Capacity retention rates of the coin cells of Examples 1 to 11 and Comparative Example 1 were evaluated and the evaluation results thereof are shown in Table 2 below.

Each of the coin cells of Examples 1 to 11 and Comparative Example 1 was charged at a constant current of 0.1 C rate and 25° C. until the voltage reached 4.40 V (vs. Li) and was then cut off at 0.05 C rate while maintaining a constant voltage of 4.40 V. Subsequently, each coin cell was discharged at a constant current of 0.1 C rate until the voltage reached 2.8 V (vs. Li) (formation process, 1st cycle). The cycle of charging and discharging was repeated twice more, thereby completing the formation process.

After the formation process, each lithium secondary battery was charged at a constant current of 0.7 C, at room temperature (25° C.), and a voltage ranging from about 3.0 V to about 4.4 V (vs. Li metal) and was then discharged at a constant current of 0.5 C until a cut-off voltage reached 4.4 V.

The charging and discharging processes described above were repeated 99 times and thus were performed a total of 100 times. Changes in discharge capacity according to charging and discharging cycles are shown in FIG. 4.

In Table 2 below, the capacity retention rate denotes a number of cycles showing a discharge capacity of 80% with respect to initial capacity.

TABLE 2

|  | Composition and thickness of protective film | Capacity retention rate (%) |
| --- | --- | --- |
| Example 1 | GeTe 15 nm | 65 times @80% |
| Example 2 | GeTe 10 nm | 60 times @80% |
| Example 3 | GeTe 5 nm | 55 times @80% |
| Example 4 | SbTe 15 nm | 49 times @80% |
| Example 5 | SbTe 10 nm | 47 times @80% |
| Example 6 | SbTe 5 nm | 44 times @80% |
| Example 7 | SnTe 15 nm | 66 times @80% |
| Example 8 | SnTe 10 nm | 60 times @80% |
| Example 9 | SnTe 5 nm | 54 times @80% |
| Example 10 | LiAlTe 15 nm | 79 times @80% |
| Example 11 | LiGeTe 15 nm | 75 times @80% |
| Comparative Example 1 | Li metal (Bare Li) | 45 times @80% |

Referring to Table 2, it is confirmed that the coin cells of Examples 1 to 11 exhibited a higher capacity retention rate than that of the coin cell of Comparative Example 1.

As is apparent from the foregoing description, a lithium battery with enhanced lifespan and energy density characteristics may be manufactured using a protective film according to an embodiment.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium battery comprising:
   an anode;
   a cathode; and
   a protective film disposed on the anode and between the anode and the cathode,
   wherein the protective film comprises a compound comprising
     at least one of a Group 13 element, a Group 14 element, a Group 15 element, or a first Group 16 element, and
     a second Group 16 element,
   wherein the first Group 16 element is different from the second Group 16 element.

2. The lithium battery of claim 1, wherein the second Group 16 element is Te.

3. The lithium battery of claim 1, wherein the at least one of the Group 13 element, the Group 14 element, or the Group 15 element comprises at least one of B, C, N, Al, Si, P, As, In, Tl, Pb, Bi, Ga, Sb, Sn, or Ge, and the first Group 16 element comprises at least one of Po, O, or Se.

4. The lithium battery of claim 1, wherein the compound comprises at least one of $Sb_aTe_{1-a}$, $Ge_aTe_{1-a}$, $B_aTe_{1-a}$, $C_aTe_{1-a}$, $N_aTe_{1-a}$, $O_aTe_{1-a}$, $Si_aTe_{1-a}$, $P_aTe_{1-a}$, $Sn_aTe_{1-a}$, $As_aTe_{1-a}$, $Se_aTe_{1-a}$, $In_aTe_{1-a}$, $Tl_aTe_{1-a}$, $Pb_aTe_{1-a}$, $Bi_aTe_{1-a}$, $Po_aTe_{1-a}$, $Ge_aTe_{1-a}$, or $Sb_aGe_bTe_{1-a-b}$, wherein $0<a<1$ and $0 \leq b<1$.

5. The lithium battery of claim 4, wherein the compound comprises at least one of SbTe, GeTe, BTe, CTe, NTe, OTe, AlTe, SiTe, PTe, SnTe, GaTe, AsTe, SeTe, InTe, TlTe, PbTe, BiTe, PoTe, or SbGeTe.

6. The lithium battery of claim 1, wherein an amount of the at least one of the Group 13 element, the Group 14 element, or the Group 15 element is from about 0.1 moles to about 4 moles, based on 1 mole of the second Group 16 element.

7. The lithium battery of claim 1, wherein the compound further comprises Li.

8. The lithium battery of claim 7, wherein an amount of Li is from about 0.01 parts by weight to about 20 parts by weight, based on 100 parts by weight of the compound.

9. The lithium battery of claim 7, wherein the compound comprises at least one of LiGeTe, LiSbTe, or LiSnTe.

10. The lithium battery of claim 1, wherein the protective film has a thickness of about 0.1 nanometer to about 30 nanometers.

11. The lithium battery of claim 1, wherein the protective film comprises an amorphous phase.

12. The lithium battery of claim 11, wherein the protective film further comprises a crystalline phase, wherein an amount of the crystalline phase is about 10 volume percent or less, based on a total volume of the protective film.

13. The lithium battery of claim 1, wherein the anode is a Li metal foil or a Li metal alloy foil.

14. The lithium battery of claim 1, wherein the lithium battery comprises an electrolyte comprising at least one of a liquid electrolyte, a solid electrolyte, or a gel electrolyte.

15. The lithium battery of claim 14, wherein the liquid electrolyte comprises at least one of an organic solvent, an ionic liquid, a polymer ionic liquid, or a lithium salt.

16. The lithium battery of claim 1, wherein the protective film is an anode protective film.

17. A method of manufacturing a lithium battery according to claim 1, the method comprising forming a protective film on a base, wherein the protective film comprises a compound comprising:

at least one of a Group 13 element, a Group 14 element, a Group 15 element, or first Group 16 element, and a second Group 16 element, wherein the first Group 16 element is different from the second Group 16 element, and wherein forming the protective film comprises depositing the compound on the base to manufacture the lithium battery.

18. The method of claim 17, wherein the depositing comprises at least one of physical vapor deposition or chemical vapor deposition.

19. The method of claim 17, wherein the depositing comprises sputtering.

20. The method of claim 17, wherein the method further comprises performing a heat treatment at about 180° C. or less after the depositing of the compound.

* * * * *